US009654613B2

(12) United States Patent
Griffin

(10) Patent No.: US 9,654,613 B2
(45) Date of Patent: *May 16, 2017

(54) DUAL-MODE COMMUNICATION DEVICES AND METHODS FOR ARENA GAMING

(71) Applicant: Kevin Griffin, Sammamish, WA (US)

(72) Inventor: Kevin Griffin, Sammamish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,723

(22) Filed: May 2, 2016

(65) Prior Publication Data

US 2016/0243444 A1    Aug. 25, 2016

Related U.S. Application Data

(63) Continuation of application No. 13/934,039, filed on Jul. 2, 2013, now Pat. No. 9,357,152.

(Continued)

(51) Int. Cl.
*H04W 36/04* (2009.01)
*H04M 1/725* (2006.01)
(Continued)

(52) U.S. Cl.
CPC .......... *H04M 1/7253* (2013.01); *A63F 13/12* (2013.01); *A63F 13/327* (2014.09); *A63F 13/34* (2014.09); *A63F 13/35* (2014.09); *A63F 13/358* (2014.09); *A63F 13/60* (2014.09); *G02C 11/10* (2013.01); *G08C 23/04* (2013.01); *H04N 5/4403* (2013.01); *H04N 21/40* (2013.01); *H04N 21/4122* (2013.01); *H04N 21/4126* (2013.01); *H04N 21/42202* (2013.01); *H04N 21/43637* (2013.01); *H04N 21/4781* (2013.01); *H04N 21/482* (2013.01); *H04N 21/6125* (2013.01);

(Continued)

(58) Field of Classification Search
CPC .......... A63F 13/06; A63F 13/10; A63F 13/13
See application file for complete search history.

(56) References Cited

U.S. PATENT DOCUMENTS 6,895,255 B1    5/2005  Bridgehall
2004/0242210 A1    12/2004  Tagliabue et al.
(Continued)

OTHER PUBLICATIONS

International Search Report and Written Opinion of the International Searching Authority dated Oct. 31, 2013, in International Patent Application No. PCT/US13/49143, 6 pages.

*Primary Examiner* — Dmitry Suhol
*Assistant Examiner* — Ankit Doshi
(74) *Attorney, Agent, or Firm* — Ellen M. Bierman; Lowe Graham Jones PLLC

(57) ABSTRACT

Methods, systems, and techniques for dual-mode communication are provided. Example embodiments provide an enhanced mobile device that includes a CPU, a low latency transceiver, and a high latency transceiver. The enhanced mobile device is in communication with a console via both the low latency transceiver and the high latency transceiver. The console also includes a CPU, a low latency transceiver, and a high latency transceiver. In some embodiments, the low latency communication channel is used to transmit control messages to an entertainment console whereas the high latency communication channel is used to communicate data between the mobile device and the entertainment console. The dual-mode communication may be used in different scenarios, including with an entertainment console for arena gaming and other entertainment applications.

25 Claims, 10 Drawing Sheets

Related U.S. Application Data

(60) Provisional application No. 61/667,261, filed on Jul. 2, 2012, provisional application No. 61/675,211, filed on Jul. 24, 2012, provisional application No. 61/682,668, filed on Aug. 13, 2012.

(51) Int. Cl.

| | | |
|---|---|---|
| H04N 5/44 | (2011.01) | |
| A63F 13/358 | (2014.01) | |
| H04N 21/40 | (2011.01) | |
| H04W 88/06 | (2009.01) | |
| A63F 13/30 | (2014.01) | |
| G02C 11/00 | (2006.01) | |
| H04N 21/41 | (2011.01) | |
| H04N 21/422 | (2011.01) | |
| H04N 21/4363 | (2011.01) | |
| H04N 21/478 | (2011.01) | |
| H04N 21/482 | (2011.01) | |
| H04N 21/643 | (2011.01) | |
| H04N 21/61 | (2011.01) | |
| A63F 13/327 | (2014.01) | |
| A63F 13/34 | (2014.01) | |
| G08C 23/04 | (2006.01) | |
| A63F 13/35 | (2014.01) | |
| A63F 13/60 | (2014.01) | |
| H04W 4/00 | (2009.01) | |

(52) U.S. Cl.
CPC ... *H04N 21/6137* (2013.01); *H04N 21/64322* (2013.01); *H04W 4/008* (2013.01); *H04W 88/06* (2013.01); *A63F 2300/204* (2013.01); *A63F 2300/534* (2013.01); *A63F 2300/538* (2013.01)

(56) References Cited

U.S. PATENT DOCUMENTS

| | | |
|---|---|---|
| 2004/0259537 A1 | 12/2004 | Ackley |
| 2007/0099703 A1 | 5/2007 | Terebilo |
| 2008/0039089 A1 | 2/2008 | Berkman et al. |
| 2009/0258672 A1 | 10/2009 | Camp, Jr. et al. |
| 2009/0305789 A1 | 12/2009 | Patil |
| 2010/0329491 A1 | 12/2010 | Johansen |
| 2011/0001808 A1 | 1/2011 | Mentz et al. |
| 2011/0004496 A1 | 1/2011 | Erb |
| 2011/0243141 A1 | 10/2011 | Blackburn et al. |
| 2011/0319073 A1 | 12/2011 | Ekici et al. |
| 2012/0094757 A1 | 4/2012 | Vago et al. |
| 2012/0170521 A1 | 7/2012 | Vogedes et al. |
| 2012/0171960 A1 | 7/2012 | Oshinsky et al. |
| 2012/0309388 A1 | 12/2012 | Moosavi et al. |
| 2013/0044130 A1 | 2/2013 | Geisner |
| 2013/0107129 A1 | 5/2013 | Britt, Jr. |
| 2013/0231105 A1 | 9/2013 | Bai et al. |
| 2013/0286004 A1 | 10/2013 | McCulloch et al. |
| 2014/0002753 A1 | 1/2014 | Griffin |
| 2014/0004945 A1 | 1/2014 | Griffin |
| 2014/0364164 A1 | 12/2014 | Griffin |
| 2016/0173677 A1 | 6/2016 | Griffin |

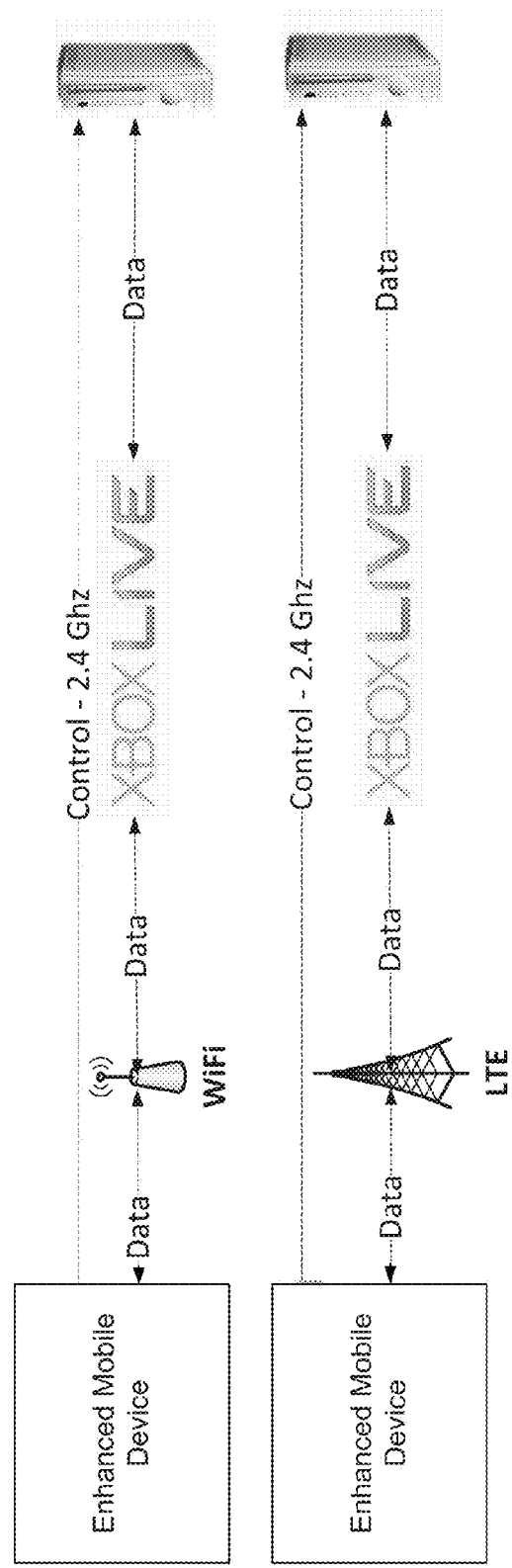

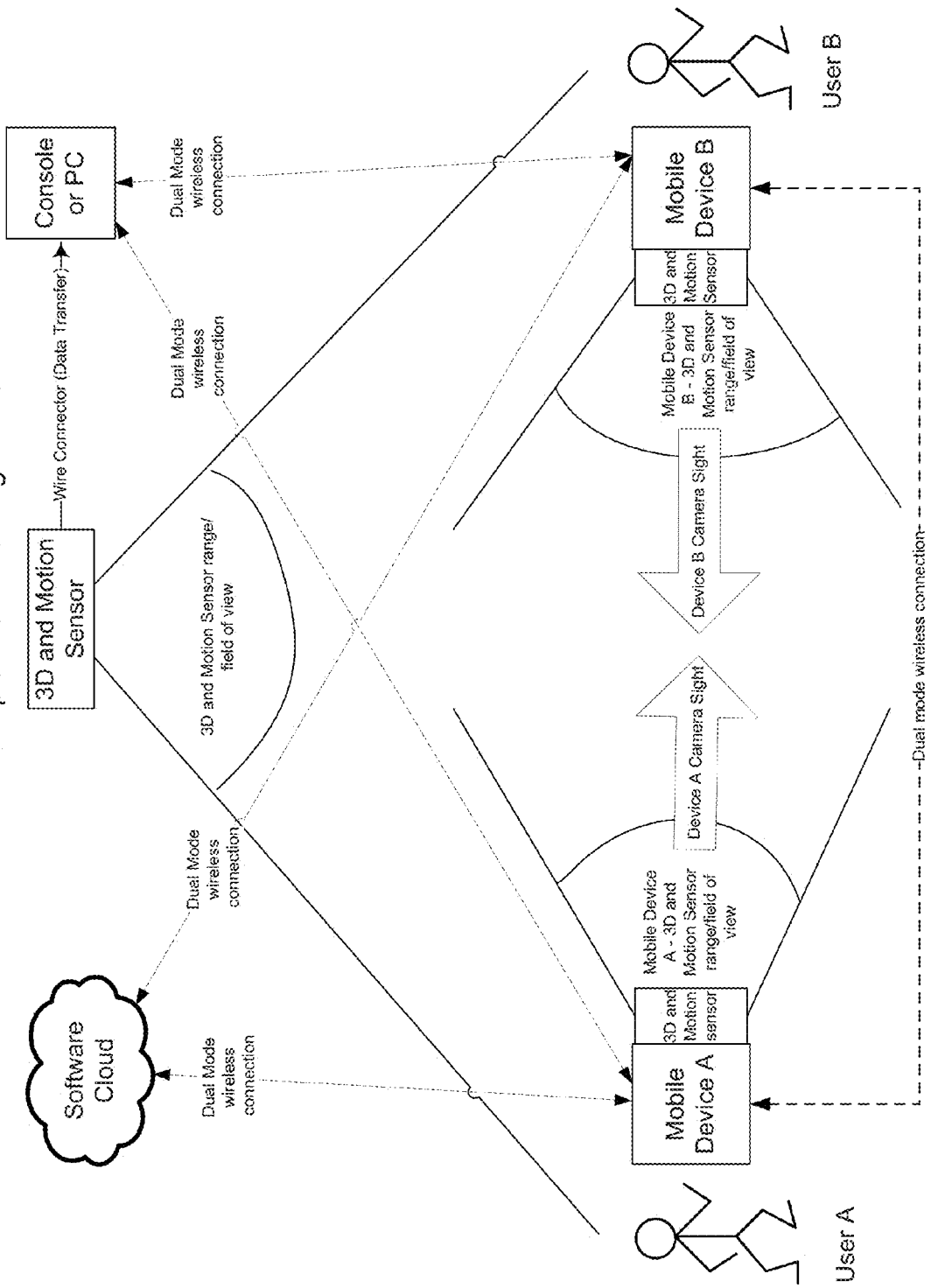

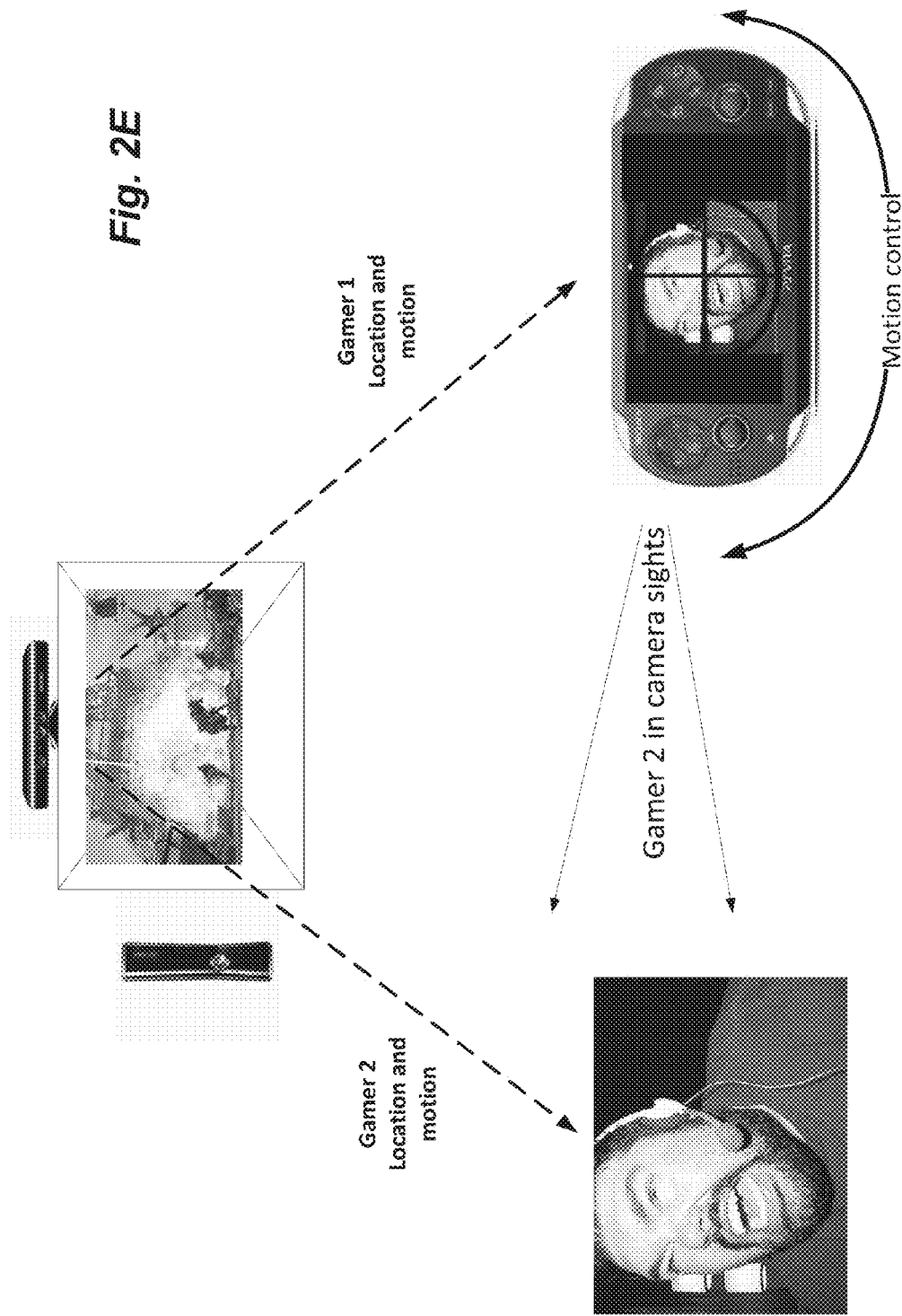

Fig. 3.1

3100: A process for providing an arena gaming environment

3101: managing an arena gaming environment that includes a gaming system and multiple mobile devices that are each operated by a corresponding player and that each include a low latency transceiver and a high latency transceiver, by:

3102: receiving control messages from each of the multiple mobile devices via its corresponding low latency transceiver, the control messages including sensor inputs from the multiple mobile devices

3103: modifying a game model based on the received control messages, the game model representing information about player locations in the arena gaming environment

3104: transmitting game data to each of the multiple mobile devices via its corresponding high latency transceiver, the transmitted game data based on the modified game model

Fig. 3.2

3200: The process of 3100, wherein the modifying a game model includes:

3201: updating player locations in the game model based on sensor data received via low latency connections to the multiple mobile devices, the sensor data obtained from location/orientation sensors of the multiple mobile devices

3202: determining whether a first player is directing a game action towards a second player, based on their respective locations represented in the game model, the game action including one of an aiming action, a weapon firing action, a throwing action, a catching action, and/or an item exchanging action

Fig. 3.3

3300: The process of 3100, wherein the modifying a game model includes:

3301: updating player locations in the game model based on sensor data received from a motion sensor of the gaming system

3302: updating player locations in the game model based on sensor data received from motions sensors of the multiple mobile devices

Fig. 3.4

3400: The process of 3100, further comprising:

3401: transmitting, by a first one of the multiple mobile devices to a second one of the multiple mobile devices, sensor data obtained from a motion/position/orientation sensor of the first mobile device

3402: causing the second mobile device to update a game model stored on the second mobile device based on the transmitted sensor data, the game model representing the location of the player corresponding to the first mobile device

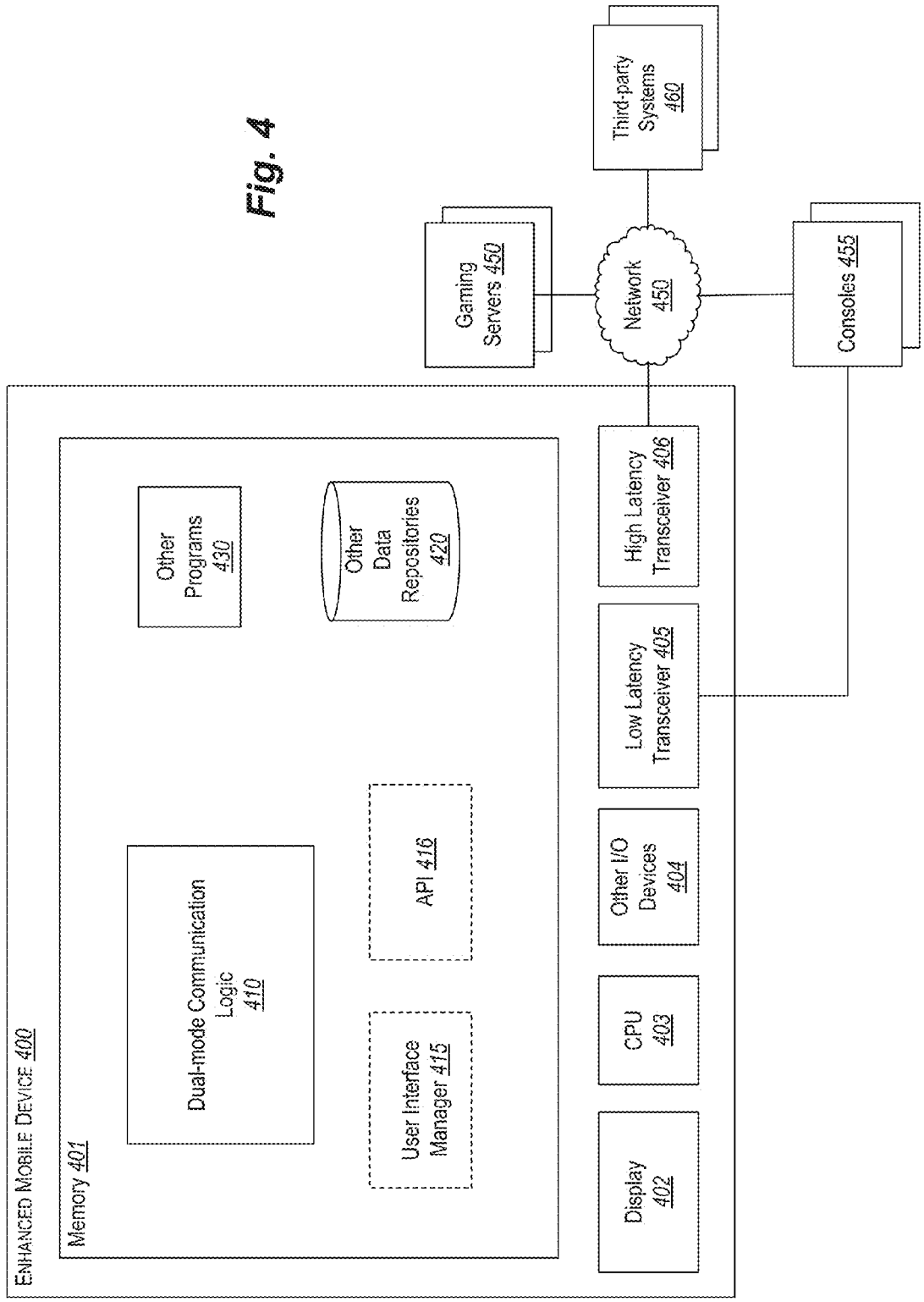

DUAL-MODE COMMUNICATION DEVICES AND METHODS FOR ARENA GAMING

CROSS-REFERENCE TO RELATED APPLICATIONS

This application is a continuation of U.S. patent application Ser. No. 13/934,039 filed Jul. 2, 2013, which application claims the benefit of priority from U.S. Provisional Patent Application Nos. 61/667,261 filed Jul. 2, 2012; 61/675,211 filed Jul. 24, 2012; and 61/682,668 filed Aug. 13, 2012, which applications are incorporated herein by reference in their entireties.

TECHNICAL FIELD

The present disclosure relates to methods, techniques, devices, and systems for interacting with an entertainment system and, more particularly, to methods, techniques, devices, and systems for interacting with a gaming system using a dual-mode communication device.

BRIEF DESCRIPTION OF THE DRAWINGS

FIG. 2B illustrates a combination of low and high latency communication according to an example embodiment.

FIGS. 2D and 2E illustrate an example arena gaming environment according to an example embodiment.

FIGS. 3.1-3.4 are example flow diagrams of processes performed by example embodiments.

FIG. 4 is an example block diagram of an example computing system for implementing example embodiments.

DETAILED DESCRIPTION

Figure 1:
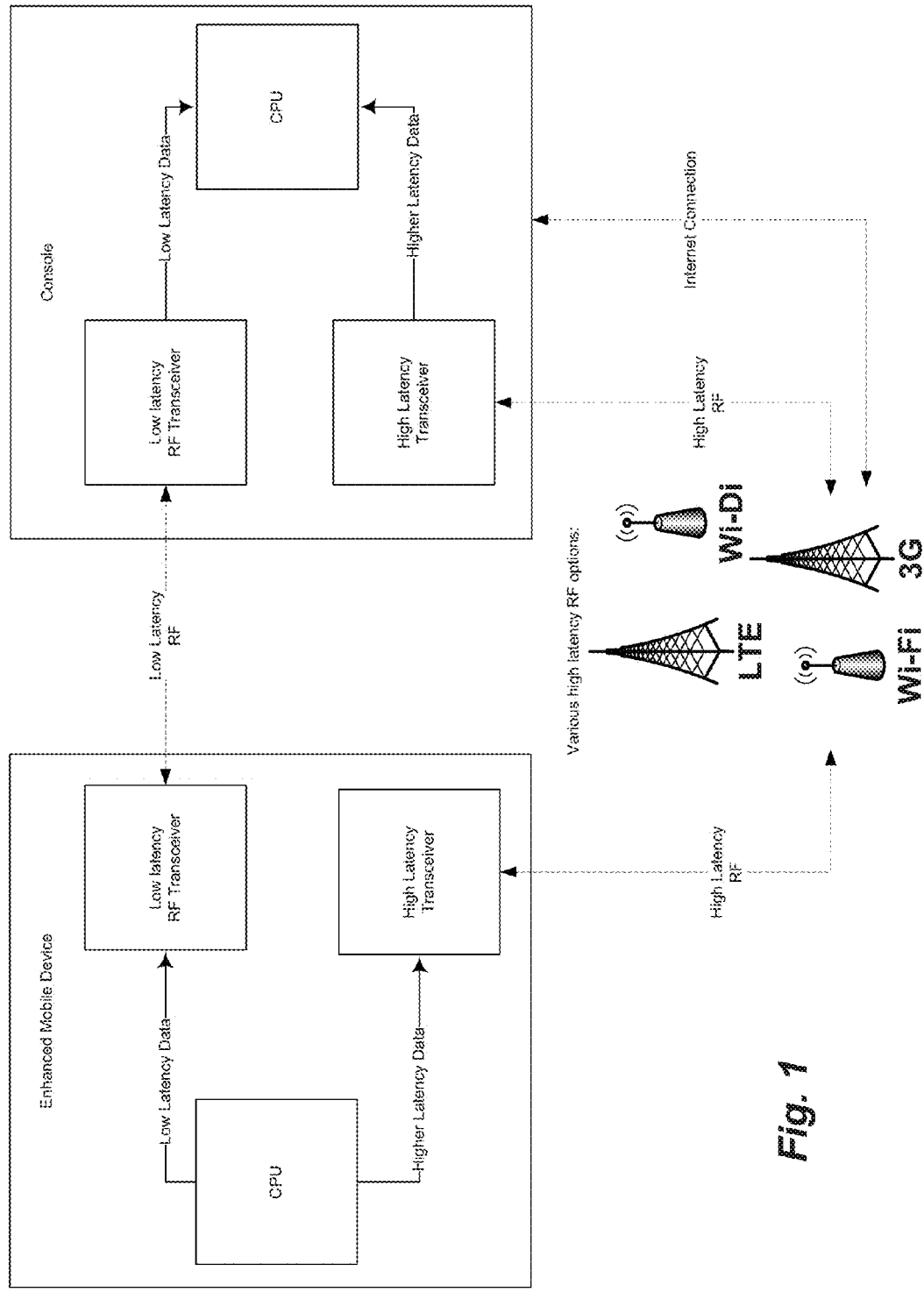
FIG. 1 is an example block diagram illustrating dual-mode communication according to an example embodiment.

The current mobile device environment lacks any kind of fast/low latency wireless connection to entertainment systems, such as gaming consoles, set-top boxes, or the like. This deficiency stands in the way of the goal of providing a seamless wireless connected experience between smart phones (and other mobile devices) and home entertainment systems. Latency is a measure of time delay experienced in a communication system. Latency may be measured as the time from the beginning of a transmission (e.g., a signal, packet, etc.) to the beginning of the reception of the transmission. Latency is related to response time, as a low latency connection will typically result in a lower response time and thus more interactivity. Accordingly, low latency connections are typically used or preferred where fast, highly interactive control is critical, like in a game controller. But low latency connections may have lower range (e.g., 2.4 GHz and/or Bluetooth) and/or provide less bandwidth to transmit or receive data. High bandwidth data connections, like Wi-Fi, have greater latency and do not work effectively when employed in scenarios where a game controller would be used because of the much greater latency. Higher bandwidth connections may be utilized where the amount or volume of data being sent is larger, as in megabytes, and gigabytes, but not needing low latency/faster response times.

The techniques described herein are based on dual-mode console/device communication. In some embodiments, a mobile device (e.g., a smart phone, tablet computer, smart glasses) is enhanced and/or configured to include a low latency transmitter and a high latency transceiver. The enhanced mobile device can then be used to transmit via the low latency transmitter control signals (e.g., gaming commands such as up/down, left/right) to an entertainment console (e.g., a game system, set-top box). Typically, the low latency transceiver is short range and low bandwidth, such as 2.4 Ghz game controller communication protocols, Bluetooth, infrared, or the like. Note that in some embodiments, the low latency transmitter may be, or be part of, a low latency transceiver, such that bidirectional low-latency communication with the console is possible. However, it is not necessary for the enhanced mobile device to have the capability to receive data over a low latency connection.

In general, a low latency communication includes any connection having a latency that is low enough to support a particular interactive gaming or entertainment experience. Thus, "low latency" may depend in part on the application or setting. For an interactive, real-time video game, a latency of up to 40 ms may be acceptable (while some games and users may require even lower latencies, such as 10 ms, 15 ms, 20 ms, or the like). For channel surfing or menu navigation, a latency of between 50 and 100 ms may be acceptable to provide an interactive experience. In addition, latency may be measured with respect to the communication link (e.g., the time taken for the first bit of data to arrive at the receiver), while excluding processing time by the application. If such a measurement is used, then a lower latency connection may be required, to account for application processing time. Thus, if the application processing time is 20 ms, then a maximum acceptable latency of the communication link may be lower (e.g., 20 ms to yield a total latency of 40 ms that includes application processing time of 20 ms).

Concurrently, the mobile device can communicate data (e.g., game data, image data, video data, audio data) with the entertainment console via the high latency transceiver. Typically, the high latency transceiver provides higher bandwidth than the low latency transmitter. For example, the high latency transceiver may communicate via IP over a Wi-Fi, 3G, or 4G (e.g., LTE) connection.

Using the described techniques, seamless entertainment becomes possible between a mobile device and a console. The techniques can provide experiences such as playing the same game on both a console and smart phone, controlling streaming movies on a TV from a smart phone, and transferring movies from a TV to a smart phone (and vice versa) midstream, and the like.

Note that many of the examples herein are based on a mobile device that is a smart phone enhanced to perform dual-mode communication. However, in other embodiments, other mobile devices may be similarly enhanced. Other example mobile devices include, but are not limited to, tablet computers, eBook readers, smart glasses (e.g., eyeglasses or goggles that include a display mechanism), and display-enabled helmets.

Introduction & Overview

FIG. 1 is an example block diagram illustrating dual-mode communication according to an example embodiment. FIG. 1 illustrates an enhanced mobile device that includes a CPU, a low latency transceiver, and a high latency transceiver. The enhanced mobile device is in communication with a console via both the low latency transceiver and the high latency transceiver. The console also includes a CPU, a low latency transceiver, and a high latency transceiver. Note that in some embodiments, the low latency communication between the enhanced mobile device and the console is one-way or unidirectional. That is, the enhanced mobile device may only be able to transmit to (and not receive from) the console via the low latency communication connection/ link. Furthermore, the low latency connection may not rely on handshaking or similar operations, such as may be required to set up or tear down a TCP/IP connection.

Dual-mode wireless communication according to some embodiments includes at least some of the following features:

- Utilize existing console 2.4 GHz wireless connection or Bluetooth schema for control commands
- Typical control commands may include existing console controller commands such as: dual analog stick movement (up/down, left right, push), d-pad (8 way digital control pad), action input buttons, adjustable analog triggers, start and back buttons, power or command button.
- Device control commands, sensors, or input devices become available to the console. These console control commands may include: smart phone touch screen and (soft) keyboard inputs, tilt, bank, motion (e.g., accelerometer, magnetometer, gyroscope), compass/direction, GPS/AGPS, camera aiming. Also, future device control commands similar to Microsoft's Kinect sensor could be built into a device for 3D gaming.
- Feedback from the console sent back to the enhanced mobile device over the low latency connection may include low response time feedback such as a vibration signal sent to the device (e.g., to signal when the user collides with an object in a driving game).
- Utilize Wi-Fi, 3G, 4G (e.g., LTE), or future data connections for high bandwidth data transfer.
- Example uses for data transfer include: 2nd (or 3rd, 4th, etc.) screen display for a game being played where the 1st screen may be a TV connected to a console (or vice versa), metadata relevant to a game being played on the main console connected TV, soft controls (graphically display on the device screen) that change relevant to a level of a game, options available at certain points in a game, a game map that updates as the player moves, metadata relevant to a movie or other video program being watched on the main screen, mobile user profile storage, and also used to map an area around the user by utilizing the device camera to input the visual setting around the user. Voice commands or other input can also be transferred via data to the console.

In some embodiments, low latency communication is provided via a 2.4 GHz and/or Bluetooth connection schema or protocol. For example, in the case of Microsoft Xbox 360, a proprietary 2.4 GHz game controller protocol is used. For Nintendo Wii and Sony PS3 consoles, Bluetooth is utilized. The term "Bluetooth" may include current and future versions of the proprietary open protocol for creating short range personal area networks, communicating in the 2.4-2.48 GHz range, using frequency hopping spread spectrum techniques utilizing 79 channels of 1 MHz each. In some cases error checking (e.g., Extended Synchronous Connections) may be utilized, although in some embodiments some error checking protocols may not be used to reduce latency.

Some embodiments include multiple low latency transmitters (or transceivers). For example, the enhanced mobile device may include both a Bluetooth transceiver and an infrared transmitter. In such cases, the enhanced device may include logic to determine which of the multiple transmitters to use. For example, the enhanced device may preferentially utilize one transmitter until it has reached or is near its capacity, and then transmit overflow data via the other transmitter. As another example, the enhanced device may seek to divide or balance the transmission load between the two (or more) transmitters. In some embodiments, the choice of transmitter to use may be exposed to the game application or other software, so that an application developer may control which transmitter to use.

In some embodiments, control commands (and other signals, messages, or data needing a low latency connection) are separated from more data intensive examples (mentioned above) by logic executing on the CPU. Control commands are converted to protocol format for transfer across the 2.4 GHz game controller or Bluetooth band. The enhanced mobile device then employs its 2.4 GHz game controller or Bluetooth transmitter to send a signal in the protocol format specified. On the other end, the console receiver receives radio waves emitted by device receiver and the data in protocol is converted by CPU to perform commands with respect to an application or other function/code performed by the console. In reverse, if the console needs to send fast, low latency data to the enhanced mobile device, it can do so over the same connection as both the device and console may have transmit and receive functionality.

In some embodiments, when the enhanced mobile device or console CPU determines or identifies data that is of a non-control type suitable for transmission by a higher latency, higher bandwidth connection like Wi-Fi, LTE, or 3G, (or a future high bandwidth data connections), it converts the data to the specified protocol format required for transfer across the higher bandwidth connection. This higher bandwidth data is received by the corresponding high latency receiver and employed to perform higher bandwidth, higher latency activities of the type described above.

Figure 2A:
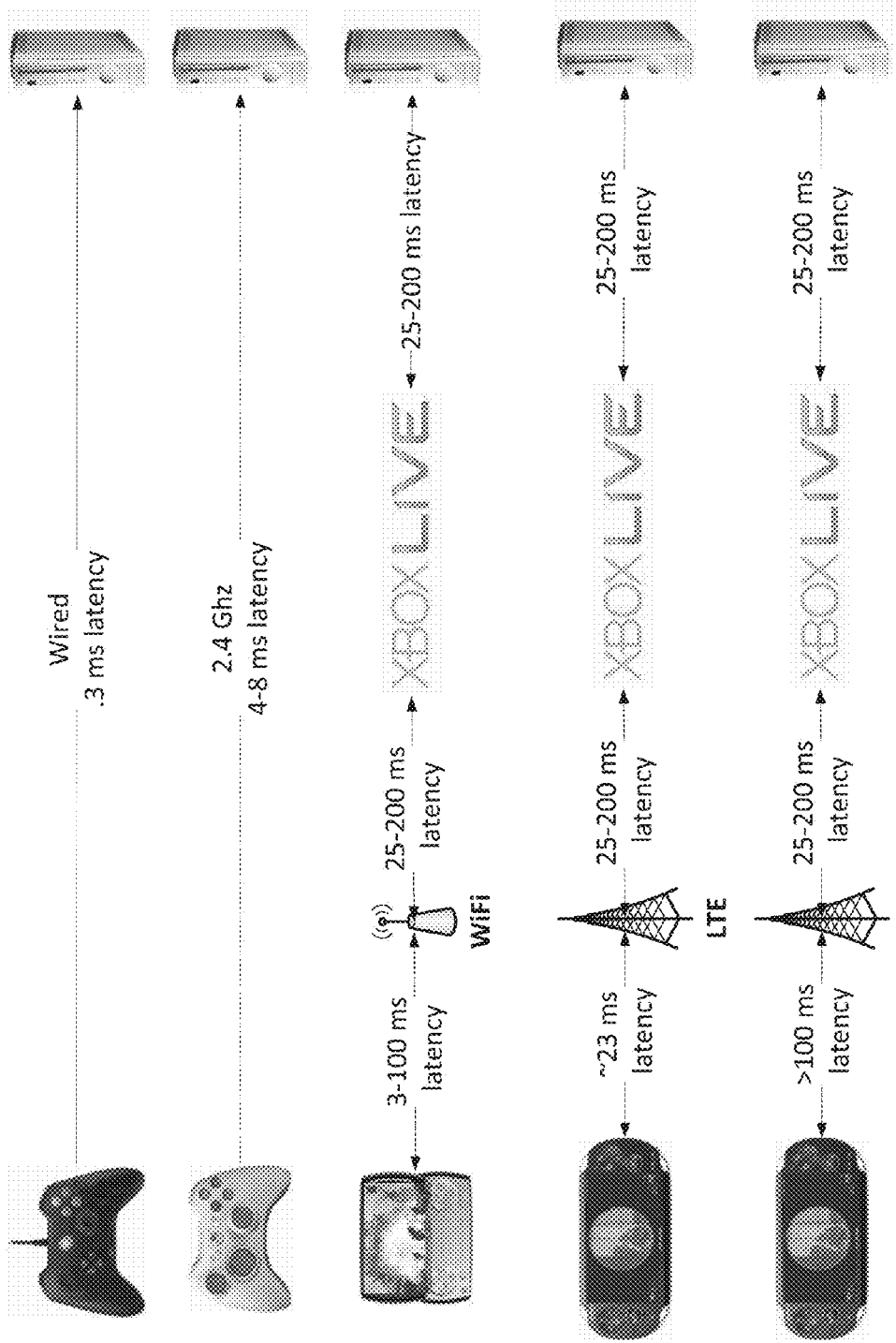
FIG. 2A compares latency of various communication mechanisms.

FIG. 2A compares latency of various communication mechanisms. In particular, FIG. 2A compares the latency of example wire-based communication between a game controller and a game console (0.3 ms) and example direct 2.4 GHz wireless communication between a game controller and a game console (4-8 ms). While the latency of direct wireless communication is greater than that of wire-based communication, it is still low enough to play highly interactive video games.

FIG. 2A also compares the latency of various indirect, high latency communication approaches between a mobile device (e.g., smart phone) and a game console. The compared approaches all utilize a Wi-Fi or cellular network in addition to various intermediary devices (e.g., a wireless router) or systems (e.g., cellular network). In particular, FIG. 2A compares the latency of communication between a mobile device and a game console via a Wi-Fi network, an LTE network, and a 3G network. In this example, Wi-Fi provides the lowest latency of the three approaches-about 53 ms in the best case (the sum of 3 ms from smart phone to wireless router, 25 ms from router to intermediary system, 25 ms from intermediary system to game console). However, this best-case latency far exceeds that required to provide an enjoyable interactive gaming experience.

FIG. 2B illustrates a combination of low and high latency communication according to an example embodiment. FIG. 2B shows how low and high latency communication may be combined in example embodiments. In particular, low latency control-oriented communication is performed via a 2.4 GHz mechanism, and high latency data-oriented communication is performed via a Wi-Fi or LTE network. By incorporating both communication mechanisms in a single enhanced mobile device, the enhanced mobile device may be employed to provide an enjoyable, interactive gaming or viewing experience.

Figure 2C:
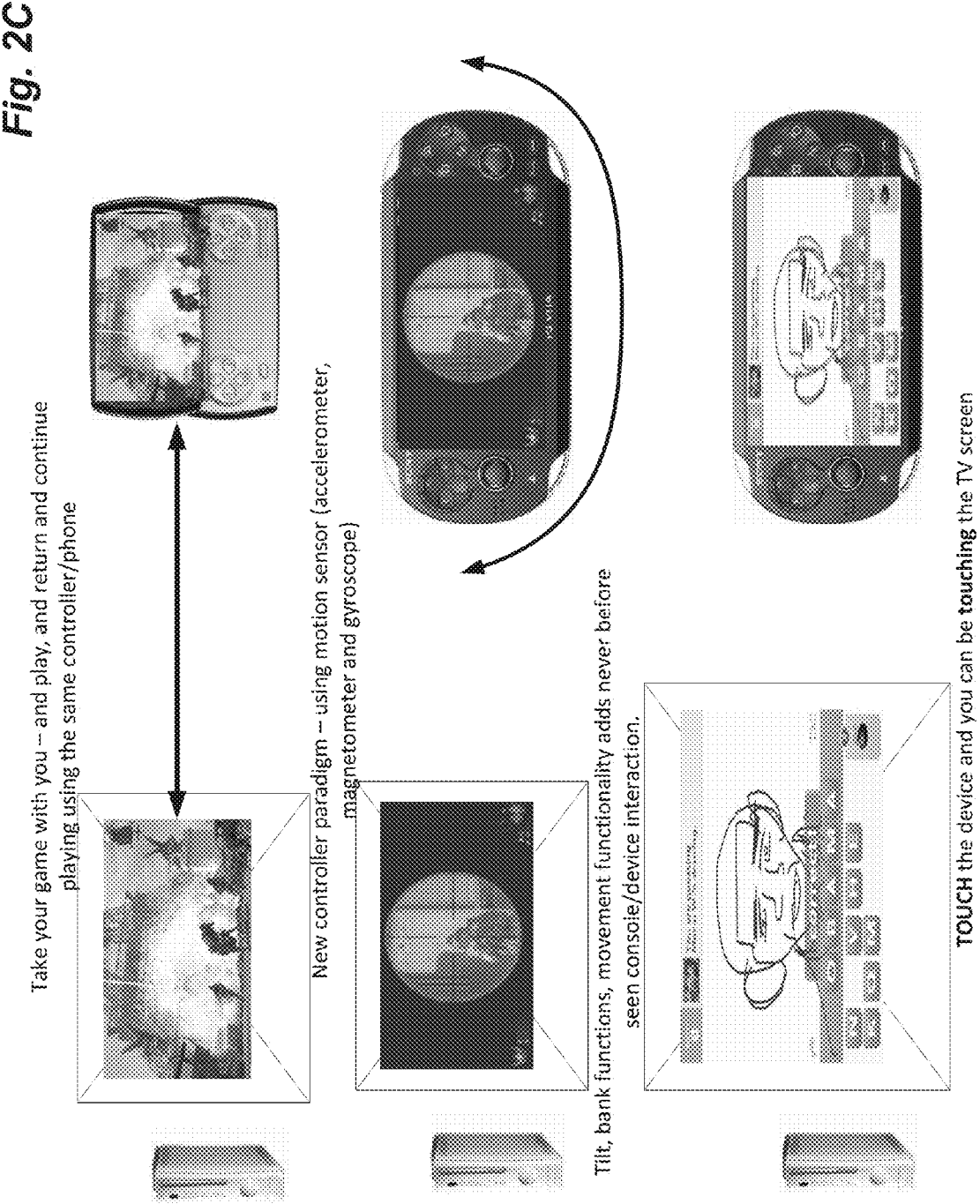
FIG. 2C illustrates advanced gaming scenarios facilitated via dual-mode communication according to an example embodiment.

FIG. 2C illustrates advanced gaming scenarios facilitated via dual-mode communication according to an example embodiment. In particular, FIG. 2C illustrates game or program portability, new controller paradigms (e.g., using advanced sensors of mobile devices, such as accelerometers and gyroscopes), and remote touch screens (e.g., touching a screen of a mobile device is translated to a "touch" or input to a remote television or other display).

The described techniques may bring a new level of precision and accuracy to gaming applications. Current tilt-based gaming uses only the accelerometer, resulting in an imprecise record of motion, which while still fun, is noticeably coarse in the level of control afforded. However, with the addition of a gyroscope together with high-precision sensor fusion and calibration, games can be controlled in a more precise and granular fashion, enabling more advanced tilt- and twist-based games. This has proved popular with both advanced and casual golfers, as advanced motion can track the speed and arc of your swing, as well as the angle of the club face, and is therefore able to provide a very accurate replication of your golf shot, with distance, elevation hook and slice all accounted for accurately. In addition, advanced motion technology can enable your phone to be used to control game consoles and other gaming devices.

Arena Gaming

FIGS. 2D and 2E illustrate an example arena gaming environment according to an example embodiment. In some embodiments, enhanced mobile devices as discussed herein may be used by multiple users to engage in interactive, immersive, real time, multi-player video game experiences.

The advent of motion controllers and motion sensors in console, PC and mobile gaming has transformed entertainment from a static, "sit on the couch" environment to an interactive movement-based paradigm. The user's movements are sensed by the platform (e.g., console, PC, mobile) and translated into movements displayed by entertainment software or application on a screen. Jumping, dancing, lunging, waving arms, and the like, are all sensed and interpreted into movement in a game or application.

The existing gaming paradigm typically includes one of more users interacting directly with the TV or device via the methods above. What is absent is the ability for users who are proximately situated (e.g., present in the same room or other enclosed space) to interact with each other. For example, given a first and second player who are in the same room, there is no way for the player to shoot at, throw a ball to, or otherwise direct game play towards, the second player by aiming a controller at the second player.

By combining motion sensing and/or 3D sensing functionality with enhanced mobile devices having dual-mode communication capabilities as well as enriched sensors, such as cameras, gyroscopes, compasses, and the like, the concept of multi-user arena gaming becomes possible. The techniques described below combine motion/3D sensing with enhanced dual-mode mobile devices to provide an arena gaming environment where many users can engage in game play by interacting with the environment around them as well as each other.

Enhanced dual-mode mobile devices facilitate an interactive, real-time arena gaming experience for multiple players due to their advantageous communication properties. In particular, a dual-mode mobile device can use its low latency connection to communicate with a gaming system (e.g., console or PC) and/or with other proximately located mobile devices. The low latency connection may be used to communicate sensor data (e.g., from an accelerometer) to the gaming system and/or another mobile device.

In some embodiments, adding 3D/motion sensing to the enhanced mobile device allows a user to "see" the other user's motions. For example, an enhanced mobile device that includes motion sensing may be operated by user A to target user B, even when user B does not operate an enhanced mobile device, because user A's mobile device alone is capable of sensing user B's position and movements. In other scenarios, of course, both users A and B may operate similar enhanced mobile devices. In addition, by situating motion sensing on a mobile device, players need not be in proximity to a motion sensor associated with a game console or other gaming system. For example, they may be in a different room. Furthermore, situating motion sensing on a mobile device may reduce latency, because the mobile device need not wait to receive position/motion information from a remote system.

Note that while several of the examples described herein are based on two players or gamers, typical embodiments are capable of facilitating arena gaming amongst more than two players. Also, some embodiments may include multiple motion sensing and/or 3D sensing devices to create a larger arena area than would be covered by a single sensor. In general, arena area may be expanded or enlarged by adding additional sensing devices. Each sensing device may communicate (e.g., via wireless connection) information about its local area back to the console or PC that is managing the game. Furthermore, some embodiments may be able to link multiple distinct arenas to provide a distributed gaming experience. For example, a first arena (e.g., a living room in a first house) hosting a first group of three players may be linked with a second arena (e.g., a gymnasium) hosting a second group of six players, such that players of the first group can interact with each other as well as players of the second group, and vice versa.

FIG. 2D depicts one arena gaming example. In the illustrated example, a user operating Device A is interacting with another user operating Device B. Various actions, such as a dive (to avoid a shot fired at them), a sideways movement (to avoid a punch), a throw (say of a hand grenade), a catch, a throw, or the like, are all sensed by Device A's 3D/motion sensing features. Combined with Device A's onboard mobile device capabilities; touch screen and (soft) keyboard, tilt, bank, motion (e.g., accelerometer, magnetometer, gyroscope), compass/direction, GPS/AGPS, camera aiming, it is possible to have Device A "lock on" to User B with a scope and fire at them very accurately.

Mobile devices in typical form factors (e.g., smart phone, pad or smart controller) have immediate immersive arena entertainment possibilities. New mobile form factors, such as goggles, provide an even more immersive arena experience where the user is looking through a screen to sight a target and head or eye movements are translated via dual-mode communication functionality to a PC, console, or other mobile device or gaming system.

In one embodiment, arena gaming utilizes one or more enhanced mobile devices communicating sensing and translating movement of both the mobile device, other potential users (targets) or the environment to form an immersive arena experience. A CPU on one or more of the device, the console/PC, or cloud software (or combination of) then interprets the controls below and provides feedback to the user via graphics, sound, vibration in a software program running on the PC/Console, mobile device or cloud. Some embodiments of arena gaming utilize the herein described dual-mode communication functionality to immerse the user.

Typical control commands include existing console controller commands such as: dual analog stick movement (e.g., up/down, left right, push), d-pad (e.g., 8-way digital control pad), action input buttons, adjustable analog triggers, start and back buttons, power or command button. These device control commands/inputs may also become available to the console, the cloud, and/or other gaming systems. These console control commands may include one or more of: smart phone touch screen and (soft) keyboard, tilt, bank, position/orientation/motion (accelerometer, magnetometer, gyroscope), compass/direction, GPS/AGPS, camera aiming, and the like.

As noted the low-latency connection may be used between a console and a mobile device and/or between multiple mobile devices themselves. Feedback from the console sent back to the device over the low latency connection typically includes low latency feedback such as a vibration signal sent to the device when the user might hit something when driving a car in a game. Control commands or sensor inputs from one device may also be directly shared with other mobile devices, so that other mobile devices can accurately represent or render the position, orientation, or other properties of other users/devices.

In addition, arena gaming may utilize the dual-mode capability of enhanced mobile devices for high bandwidth data transfer. Typical uses for high bandwidth data transfer include: $2^{nd}$ (or $3^{rd}$, $4^{th}$, etc.) screen display for a game being played where the $1^{st}$ screen could be a TV connected to a console (or vice versa), metadata relevant to a game being played on the main console connected TV, soft controls (graphically display on the device screen) that change relevant to a level of a game, options available at certain points in a game, a game map that updates as the player moves, metadata relevant to a movie being watched on the main screen, mobile user profile storage, and also used to map an area around the user by utilizing the device camera to input the visual setting around the user. Voice can also be transferred via data to the console.

As mentioned above, an arena or other gaming environment may be mapped by a user's camera on a mobile device, where the data would be sent by high bandwidth connection to device/console and/or cloud. Also objects and other users could be mapped by the user's camera in high detail and sent via high bandwidth connection. Once mapped, software present on the mobile device can sense changes in the arena environment when input from motion and depth sensing sensors detects changes.

Embodiments of arena gaming utilize one or more mobile devices communicating, sensing, and translating movement of both the mobile device, other potential users (targets), and/or objects in the environment (e.g., chairs, walls, obstacles, tables, pets) to form an immersive arena experience. A CPU on the device, the console/PC, and/or cloud software (or combination thereof) then interprets the controls and provides feedback to the user via graphics, sound, vibration in a software program running on the PC/Console, mobile device or cloud.

Referring again to FIG. 2D, a surface (x/y) area map is depicted and shows user A depicted by mobile device A. The previously described dual mode high and low latency connections are depicted as streaming to and from the device and labeled with "Dual Mode wireless connection." Streaming of (low latency) control and high bandwidth data can be to/from the cloud, console/PC, or another device via high bandwidth wireless connectivity and/or internet. Note that the presence of the label "Dual Mode wireless connection" should not be interpreted to mean that the use of both low and high latency connections are required as between two endpoints in all embodiments. For example, in some embodiments, two mobile devices may only communicate with one another using the low latency connection, may communicate with the cloud using only the high latency (high bandwidth) connection, and communicate with the console using both the low and high latency connection.

In FIG. 2D, a console or PC is associated with a 3D and motion sensor. The motion sensor may in other embodiments be incorporated as part of the console or PC. FIG. 2D also depicts mobile devices A and B as in range of each other and the console. When used in conjunction with a console or PC sensor, the movement and motion of device A can be tracked in 3D a given distance from the sensor providing the sensation of the user moving around a set arena. In some embodiments, multiple consoles, PCs, and/or 3D/motions sensors may be deployed. For example, a house or other residence may be configured to include a 3D motion sensor in each of the living room, recreation room, and basement, where all of the motion sensors are linked to a common console or PC.

When used without a console or PC sensor (or when players are out of range of the sensor), the mobile device(s) may be employed to track each other's movement and motion relative to each other. As one or more of the mobile devices may be in motion, the advantage of the console/PC sensor providing a fixed arena may be lost, and the devices may then move relative to each other in a virtual arena. Arena boundaries and objects that may be mapped in a static arena may become more difficult to track relative to the other device, thus interaction with a console/PCs sensor is preferred for some applications.

Mapping and aiming are facilitated by some embodiments. For example, as device A is moved around a fixed space on an X/Y/Z axis, this movement is tracked and mapped by either a console/computer 3D/motion sensor and/or the device. As the mobile device is pointed to a direction in space defined by the X/Y/Z axis, the device's own onboard 3D depth/motion sensor is able to map objects in space such as ceilings, wall, furniture, tables, etc. The console/PC tracks the location of the device based on both its own 3D/motion sensor and the device's onboard accelerometer and GPS. The console/PC further tracks the orientation (e.g., direction pointed) of the mobile device, 3D mapping information sent from the mobile device to the console/PC may be used to accurately determine a model of the arena boundaries, obstructions, and the like.

When additional mobile devices enter the mapped arena, their positions relative to objects, boundaries and other mobile devices are accurately sensed by the console/PC 3D/motion sensor and/or their own onboard 3D/motion sensors. The mobile devices can sense changes in the arena environment, based on inputs from motion and depth sensing sensors that detect changes. Also, mobile devices can be aimed and/or zoomed at other mobile devices, with information about such actions being shared with other devices or the gaming system. In response, the gaming system can update a game model or other representation of player locations and other information about the arena gaming environment.

In addition, some embodiments perform auto-detection of new players who enter the gaming arena. For example, when a third player enters the arena depicted with respect to FIG. 2D, his mobile device may be detected by the console.

Detection may be based upon the presence of signals transmitted by the mobile device of the third player, such as a Wi-Fi, Bluetooth, infrared, or other signal. In some embodiments, the console may periodically poll for new devices within the arena. When the console detects the newly arrived mobile device, it causes the device to display a prompt and/or other user interface elements that may be used by the player to enter or otherwise join the current arena game.

Some embodiments support "smart glasses." In particular, with the advent of glasses/goggles technology with built in screens, a highly immersive arena experience is provided when leveraging the above techniques in the manner specified. With glasses functioning as the mobile devices depicted in the Figures, an arena gaming scenario is readily presented. Additionally adding gun type handheld mobile devices, control inputs from the user for aiming and triggering shots, gaming arena scenarios are obvious.

Using the described techniques, some embodiments provide augmented reality or virtual reality experiences for users. With respect to virtual reality, an embodiment that uses smart glasses may immerse a player in a substitute (virtual) reality, in which the information presented via the glasses operates as a replacement for visual signals from the physical environment of the player. With respect to augmented reality, some embodiments may modify, add, incorporate, or otherwise augment views of the physical environment with game-related information, such as indications of friend or foe, weapons or other game objects possessed by other users, indications of game actions, and the like.

FIG. 2E illustrates additional aspects of an arena gaming embodiment. FIG. 2E illustrates the use of a mobile device to aim or otherwise sight another user in an arena gaming context. Note that a game user interface element (e.g., cross hairs) is superimposed upon an image/video obtained from the device camera in order to merge the gaming experience with real-world image data obtained from the camera sensor.

Note that arena gaming embodiments may be deployed in various types of public and/or private establishments or locations. Some embodiments may operate in a residential setting, such as within a living room. Other embodiments may operate in a public commercial setting, such as in a location (e.g., a warehouse) that has been configured to host arena gaming tournaments. Other commercial settings may include restaurants or bars. For example, a bar may host an arena game for players wishing to engage in a trivia game, games of chance, sporting simulations, or the like.

In addition, the described techniques need not necessarily be employed in the "gaming" context. For example, at least some of the described techniques can be used in a retail sales application. In one application, an "arena" ordering system may be installed in a coffee shop, restaurant, or other retail establishment. The ordering system may be to automatically detect the presence of a customer's mobile device (e.g., when the customer enters the establishment) and to transmit ordering information (e.g., menu information) and/or controls to the mobile device. Then, the customer may use his mobile device to review and submit an order from a menu of items available for purchase at the establishment. The ordering system may include a motion/location sensor that can detect the location of the customer, so that the customer may simply seat himself and place his order, without needing to submit the order at a counter. Then, the ordering system informs a waiter or other employee of the customer's location (e.g., table), so that the employee can make delivery of the requested items.

Example Processes

FIGS. 3.1-3.4 are example flow diagrams of processes performed by example embodiments. The following flow diagrams illustrate providing an arena gaming environment that includes enhanced mobile devices.

FIG. 3.1 is an example flow diagram of example logic for providing an arena gaming environment. The illustrated logic in this and the following flow diagrams may be performed by, for example, the mobile device 400 described with respect to FIG. 4, below. More particularly, FIG. 3.1 illustrates a process 3100 that includes operations performed by or at the following block(s).

At block 3101, the process performs managing an arena gaming environment that includes a gaming system and multiple mobile devices that are each operated by a corresponding player and that each include a low latency transceiver and a high latency transceiver, by: performing operation(s) of block(s) 3102, 3103 and 3104, described below. The arena gaming environment may be situated in a room or other space (e.g., a hall or gymnasium). In the environment, the players may interact with one another in gameplay, such as by engaging in a war game, athletic competition, capture the flag, or the like. Managing the arena gaming environment may include facilitating gameplay, receiving and storing information about players and objects in the game/environment, transmitting game information to player devices, and the like.

At block 3102, the process performs receiving control messages from each of the multiple mobile devices via its corresponding low latency transceiver, the control messages including sensor inputs from the multiple mobile devices. Mobile devices operated by the players may provide control messages, such as game control messages (e.g., up, down, left, right), sensor data (e.g., from a motion sensor, accelerometer, GPS), or the like, to the gaming system.

At block 3103, the process performs modifying a game model based on the received control messages, the game model representing information about player locations in the arena gaming environment. The gaming system may store or otherwise access a game model, such as a data structure that includes a two or three-dimensional representation of the arena and the locations of the corresponding players/devices. This game model may be updated based on location information and other sensor data obtained from the mobile devices. The game model data structure may include other fields or elements, such as for representing health or other status information about players, representing the location and other properties of non-living objects (e.g., chairs, walls, obstacles), and the like.

At block 3104, the process performs transmitting game data to each of the multiple mobile devices via its corresponding high latency transceiver, the transmitted game data based on the modified game model. The mobile devices may receive from the gaming system game data, such as image data, audio data, user interface controls, or the like. Typically, such data is transmitted via the high latency (high bandwidth) connection, although some embodiments include selection logic configured to use the low latency connection when it has available bandwidth.

FIG. 3.2 is an example flow diagram of example logic illustrating an example embodiment of process 3100 of FIG. 3.1. More particularly, FIG. 3.2 illustrates a process 3200 that includes the process 3100, wherein the modifying a game model includes operations performed by or at one or more of the following block(s).

At block 3201, the process performs updating player locations in the game model based on sensor data received via low latency connections to the multiple mobile devices, the sensor data obtained from location/orientation sensors of the multiple mobile devices. For example, the mobile devices may transmit location information from GPS receivers of the mobile devices. The mobile devices may also or instead transmit orientation information from a compass or accelerometer of the mobile devices. This information may then be used by the gaming system to update location information about the players in the game model.

At block 3202, the process performs determining whether a first player is directing a game action towards a second player, based on their respective locations represented in the game model, the game action including one of an aiming action, a weapon firing action, a throwing action, a catching action, and/or an item exchanging action. A gaming action may include any action undertaken by a player within the context of the game. Gaming actions may be made with respect to other players, such as by aiming or throwing towards another player.

FIG. 3.3 is an example flow diagram of example logic illustrating an example embodiment of process 3100 of FIG. 3.1. More particularly, FIG. 3.3 illustrates a process 3300 that includes the process 3100, wherein the modifying a game model includes operations performed by or at one or more of the following block(s).

At block 3301, the process performs updating player locations in the game model based on sensor data received from a motion sensor of the gaming system. In some embodiments, the gaming system includes or is coupled to a motion sensor that is configured to track player movements and/or locations.

At block 3302, the process performs updating player locations in the game model based on sensor data received from motions sensors of the multiple mobile devices. In some embodiments, one or more of the mobile devices themselves also include motion sensors.

FIG. 3.4 is an example flow diagram of example logic illustrating an example embodiment of process 3100 of FIG. 3.1. More particularly, FIG. 3.4 illustrates a process 3400 that includes the process 3100, and which further includes operations performed by or at the following block(s).

At block 3401, the process performs transmitting, by a first one of the multiple mobile devices to a second one of the multiple mobile devices, sensor data obtained from a motion/position/orientation sensor of the first mobile device. In some embodiments, the mobile devices share sensor data (e.g., motion sensor information) directly with other mobile devices, so as to lower latency and improve responsiveness. In other embodiments, there is no gaming system that operates as a central controller, and the game is managed in a peer-to-peer distributed manner.

At block 3402, the process performs causing the second mobile device to update a game model stored on the second mobile device based on the transmitted sensor data, the game model representing the location of the player corresponding to the first mobile device. In some embodiments, each of the mobile devices stores its own game model. This game model may be similar to the game model stored by the gaming system. In some cases, the game model local to a mobile device may be a portion or a simplified version of the game model stored by the gaming system.

Example Computing System Implementation

FIG. 4 is an example block diagram of an example computing system for implementing example embodiments. In particular, FIG. 4 shows an enhanced mobile device 400 that may be utilized as the enhanced mobile device described with respect to FIG. 1. Note that a general purpose or special purpose computing system/processor, suitably instructed, may be used to implement (or as part of) mobile device 400.

In the embodiment shown, mobile device 400 comprises a computer memory ("memory") 401, a display 402, one or more Central Processing Units ("CPU") 403, Input/Output devices 404 (e.g., keyboard, touch screen, GPS receiver, accelerometer, position sensor, and the like), a low latency transceiver 405, and high latency transceiver 406. Dual-mode communication logic 410 is shown residing in memory 401. In other embodiments, some portion of the contents, some or all of the components of the logic 410 may be stored on and/or transmitted over the other computer-readable media 405. The logic 410 and any related components preferably execute on one or more CPUs 403 to perform the techniques or functions described herein. Other code or programs 430 (e.g., gaming apps, video streaming apps, and the like) and potentially other data repositories, such as data repository 420, also reside in the memory 401, and preferably execute on one or more CPUs 403. Note that one or more of the components in FIG. 4 may not be present in any specific implementation.

The mobile device 400 interacts with the consoles 455 (e.g., gaming consoles, set-top boxes) via the low latency transceiver 405 and via the high latency transceiver 406. In the illustrated embodiment, the communication via the low latency transceiver 405 is direct. In other words, it does not pass through any intermediate systems or devices. In contrast, the communication via the high latency transceiver 406 is indirect, in that it passes through the network 450. Note also that in some embodiments, the device 400 may not be capable of receiving data via a low latency connection. In such cases, the device 400 would have a transmitter in place of the low latency the low latency transceiver 405. Furthermore, the device 400 may also or instead have one or more low latency connections to the consoles 455 via a wired connection, such as a USB cable. Note that while consoles are sometimes used as examples, the functions of a console may equivalently be incorporated or implemented within a different form factor, such as within a smart television, an all-home entertainment system, a distributed system, or the like.

The network 450 may be or include the Internet and/or any networks used to provide IP-based communication, such as a network based on Wi-Fi, Wi-Di, WiMAX, 3G, 4G, or the like. Wi-Fi may be based on standards such as IEEE 802.11b, 802.11g, 802.11n over 2.4 GHz, 3.6 GHz, 5 GHz, or other frequencies. Wi-Di may be or include WirelessHD protocols. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

The mobile device 400 may also interact with gaming servers 450 and third-party systems/applications 460. The gaming servers 450 may include servers or systems that are used to facilitate group or shared gaming. The third-party systems 460 may include servers or systems used for content distribution (e.g., media streaming servers, online music stores, Web servers), application distribution (e.g., app stores), or the like.

The logic 410 is shown executing in the memory 401 of the mobile device 400. Also included in the memory are a user interface manager 415 and an application program interface ("API") 416. The user interface manager 415 and the API 416 are drawn in dashed lines to indicate that in other embodiments, functions performed by one or more of these components may be performed externally to the logic 410.

The logic 410 performs functions described herein. For example, the logic 410 may format data for communication via the transceivers 405 and 406. As another example, the logic 410 may automatically determine which of the transceivers 405 and 406 to utilize, based on information about the data being transmitted (e.g., type, amount, priority), information about the communication medium (e.g., whether the link is saturated or not, link utilization level), information about the receiver (e.g., requirements of the console 455), or the like.

The UI manager 415 provides a view and a controller that facilitate user interaction with the logic 410 and its various components. For example, the UI manager 415 may provide interactive access to the logic 410, so that uses can configure the operation of the dual-mode communication capability of the mobile device 400.

The API 416 provides programmatic access to one or more functions of the logic 410. For example, the API 416 may provide a programmatic interface to one or more functions of the logic 410 that may be invoked by one of the other programs 430 or some other module. In this manner, the API 416 facilitates the development of third-party software, such as user interfaces, plug-ins, adapters (e.g., for integrating functions of the logic 410 into mobile applications), and the like.

In addition, the API 416 may be in at least some embodiments invoked or otherwise accessed via remote entities, the gaming servers 450, the consoles 455, and/or the third-party systems/applications 460, to access various functions of the logic 410. For example, the console 455 may select a preferred communication frequency or channel (or set other parameters) with respect to the low latency transceiver 405 via the API 416.

In an example embodiment, components/modules of the logic 410 are implemented using standard programming techniques. For example, the logic 410 may be implemented as a "native" executable running on the CPU 403, along with one or more static or dynamic libraries. In other embodiments, the logic 410 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the logic 410, such as in the data store 420, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the logic 410 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S.

patent application Ser. No. 13/934,039, filed on Jul. 2, 2013 and entitled "DUAL-MODE COMMUNICATION DEVICES AND METHODS FOR ARENA GAMING;" U.S. Patent Application No. 61/667,261, filed on Jul. 2, 2012 and entitled "DUAL-MODE COMMUNICATION DEVICES AND METHODS FOR COMMUNICATING WITH AN ENTERTAINMENT SYSTEM;" U.S. Patent Application No. 61/675,211, filed on Jul. 24, 2012 and entitled "DUAL-MODE COMMUNICATION DEVICES AND METHODS FOR ARENA GAMING;" and U.S. Patent Application No. 61/682,668, filed on Aug. 13, 2012 and entitled "DUAL-MODE EYEGLASSES;" are incorporated herein by reference, in their entireties. This application is also related by subject matter to U.S. Pat. No. 9,210,358, issued on Dec. 8, 2015 (application Ser. No. 13/934,035); to U.S. patent application Ser. No. 13/934,041 filed on Jul. 2, 2013; and to U.S. patent application Ser. No. 14/466,777, filed on Aug. 22, 2014, all of which are incorporated herein by reference in their entireties.

From the foregoing it will be appreciated that, although specific embodiments have been described herein for purposes of illustration, various modifications may be made without deviating from the spirit and scope of this disclosure. For example, the methods, techniques, and systems for dual-mode communication are applicable to other architectures or in other settings. For example, at least some of the techniques may be employed in an educational setting, so that a classroom of students may interact with a teacher and/or educational system in a classroom or distributed setting. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for providing an arena gaming environment, the method comprising:
managing an arena gaming environment that includes a gaming system and multiple mobile devices that are each operated by a corresponding player and that each include a low latency transceiver and a high latency transceiver, wherein both the low latency transceiver and the high latency transceiver are communicatively coupled to the mobile devices and the gaming system, the managing performed by:
receiving control messages from each of the multiple mobile devices via its corresponding low latency transceiver, the control messages including sensor inputs from sensors of the multiple mobile devices, wherein the sensors detect changes in the arena gaming environment including player locations;
modifying a game model data structure stored in the gaming system based on the received control messages, the game model data structure storing a game model representing information about player locations in the arena gaming environment and data representing the arena gaming environment; and
transmitting game data messages to each of the multiple mobile devices via its corresponding high latency transceiver, the transmitted game data messages based on the modified game model data structure and including at least one of game data, image data, video data, or audio data.

2. The method of claim 1, wherein the modifying a game model data structure includes:
updating player locations in the game model based on sensor data received via the low latency transceiver connections to the multiple mobile devices, the sensor data obtained from location sensors and/or orientation sensors of the multiple mobile devices; and
determining whether a first player is directing a game action towards a second player, based on their respective locations represented in the game model, the game action including one of an aiming action, a weapon firing action, a throwing action, a catching action, and/or an item exchanging action.

3. The method of claim 1, wherein the modifying a game model data structure includes:
updating player locations in the game model based on sensor data received from a motion sensor of the gaming system; and
updating player locations in the game model based on sensor data received from motions sensors of the multiple mobile devices.

4. The method of claim 1, further comprising:
transmitting, by a first one of the multiple mobile devices to a second one of the multiple mobile devices, sensor data obtained from a motion sensor, a position sensor, and/or an orientation sensor of the first mobile device; and
causing the second mobile device to update a game model data structure stored on the second mobile device based on the transmitted sensor data, the game model data structure storing game model data representing the location of the player corresponding to the first mobile device.

5. The method of claim 1, wherein the receiving control messages further comprises:
receiving control messages via a 2.4 Gigahertz frequency communication link to one of the multiple mobile devices.

6. The method of claim 1, wherein the receiving control messages further comprises:
receiving control messages via a communication connection that has a latency of less than 15 milliseconds.

7. The method of claim 1, wherein the transmitting game data messages further comprises:
transmitting data messages to one of the multiple mobile devices via IP communication or via the Internet.

8. The method of claim 1, further comprising:
automatically detecting an arrival of a third player based on a signal transmitted by a mobile device of the third player;
transmitting an invitation via the mobile device of the third player to enter the arena gaming environment; and
incorporating the third player into the game model.

9. The method of claim 1, wherein the arena gaming environment is a first arena gaming environment, and further comprising:
linking the first arena gaming environment with a second arena gaming environment that is remote from the first arena gaming environment, by:
receiving information about players situated at the second arena gaming environment;
incorporating the received information into the game model; and
presenting visual representations of the players at the second arena gaming environment to the first and/or second player via their corresponding mobile devices.

10. A system for arena gaming, the system comprising:
a gaming system having a low latency transceiver and a high latency transceiver; and
multiple mobile devices, each operated by a corresponding player, that each include a low latency transceiver and a high latency transceiver, both transceivers communicatively coupled to the gaming system, and include logic executable on a computer processor of each mobile device that is configured to:
communicate control messages with the gaming system and other of the multiple mobile devices via its low latency transceiver, the control messages including input from a sensor of the mobile device, the sensor detecting at least changes in player location; and
communicate game data messages with the gaining system via its high latency transceiver, wherein the data messages include at least one of game data, image data, video data, or audio data.

11. The system of claim 10, wherein the multiple mobile devices are each one of a smart phone or a tablet computer.

12. The system of claim 10, wherein the multiple mobile devices each operate as an input device and an additional display for a 3D game hosted by the gaming system.

13. The system of claim 10, wherein the multiple mobile devices each operate as a weapon sight configured to aim a weapon in a 3D game at other players in the arena gaining system, the 3D game hosted by the gaming system.

14. The system of claim 10, wherein the multiple mobile devices each operate as an input device configured to direct a game action at other players in the arena gaming system, the 3D game hosted by the gaming system.

15. The system of claim 10, wherein the control messages include position, motion, and/or orientation sensor data obtained from sensors of the multiple mobile devices.

16. The system of claim 10, wherein the multiple mobile devices includes: a first mobile device that displays an image that includes a view obtained from a camera of the first mobile device along with a game element.

17. The system of claim 16, wherein the game element is an aiming element operable to select a target, and wherein the target is a user depicted in the image displayed by the first mobile device.

18. The system of claim 10, wherein the gaming system is configured to prepare a model of the space about the gaming system based on sensor data received from the multiple mobile devices, and to track position, movement, and orientation of the multiple mobile devices with respect to the model of the space.

19. The system of claim 10, wherein the gaming system includes a motion sensor that is configured to track position and movement of users of the multiple mobile devices.

20. The system of claim 10, wherein the multiple mobile devices and the gaming system are located proximate to one another.

21. The system of claim 20, wherein the multiple mobile devices and the gaming system are located within 10 meters of one another.

22. The system of claim 20, wherein the gaming system is a gaming console or personal computer communicatively coupled to a display, and wherein each of the multiple mobile devices communicates gaming control signals to the gaming system via its low latency transceiver.

23. The system of claim 10, wherein the low latency transceiver includes at least one of a 2.4 Gigahertz frequency transmitter, a Bluetooth transceiver, or a transceiver with a maximum range of about 10 meters.

24. The system of claim 10, wherein the high latency transceiver of at least one of the multiple mobile devices communicates with the gaming system via at least one of IP communication, a Wi-Fi connection, a 3G connection, a 4G connection, or an LTE connection.

25. A non-transitory computer-readable medium including contents that are configured, when executed, to cause a computing system to perform a method for providing an arena gaming environment, the method comprising:
managing an arena gaming environment that includes a gaming system and multiple mobile devices that are each operated by a corresponding player and that each include a low latency transceiver and a high latency transceiver, wherein both the low latency transceiver and the high latency transceiver are communicatively coupled to the mobile devices and the gaming system, the managing performed, the managing performed by:
receiving control messages from each of the multiple mobile devices via its corresponding low latency transceiver, the control messages including sensor inputs from sensors of the multiple mobile devices, wherein the sensors detect changes in the arena gaming environment including player locations;
modifying a game model data structure in the gaming system based on the received control messages, the game model data structure storing a game model representing information about player locations in the arena gaming environment and data representing the arena gaming environment; and
transmitting game data messages to each of the multiple mobile devices via its corresponding high latency transceiver, the transmitted game data messages based on the modified game model data structure and including at least one of game data, image data, video data, or audio data.

* * * * *

UNITED STATES PATENT AND TRADEMARK OFFICE
CERTIFICATE OF CORRECTION

PATENT NO.         : 9,654,613 B2                                    Page 1 of 1
APPLICATION NO.    : 15/144723
DATED              : May 16, 2017
INVENTOR(S)        : Kevin Griffin It is certified that error appears in the above-identified patent and that said Letters Patent is hereby corrected as shown below:

In the Claims

In Column 17, Line 15, Claim 10, "gaining" should be "gaming".

In Column 17, Line 26, Claim 13, "gaining" should be "gaming".

In Column 18, Line 32, Claim 25, the first occurrence of "the managing performed" and the "," thereafter should be removed.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*